July 16, 1963  F. J. HARRIS ETAL  3,097,833
ROTARY REACTION KILN
Filed March 17, 1961

INVENTORS
FREDERICK JOHN HARRIS
GEORGE ELLIS BOUGHEY
BY Cushman, Darby & Cushman
ATTORNEYS 3,097,833
ROTARY REACTION KILN
Frederick John Harris, Leith, Edinburgh, Scotland, and George Ellis Boughey, Chester, England, assignors to Scottish Agricultural Industries Limited, Edinburgh, Scotland, a corporation of Great Britain
Filed Mar. 17, 1961, Ser. No. 96,590
Claims priority, application Great Britain Mar. 18, 1960
10 Claims. (Cl. 263—32)

The present invention relates to a rotary reaction kiln, and more particularly, but not exclusively, to such kilns as are suitable for processes in which it is desired to keep combustion or unwanted waste gases separate from reactant or product gases involved in a reaction.

In some processes, such as that for the production of sodium sulphate from sodium chloride and sulphuric acid, the co-produced gases are themselves valuable products and their recovery enhances the economics of the process.

If a direct-fired kiln is used for these processes the reaction gases are contaminated and diluted by the combustion gases and air: this not only renders recovery of the reaction gas difficult but also causes disposal problems. The separation of the reaction gases from the combustion gases may however be conveniently carried out by dividing the process essentially into two parts, a heating stage and a reaction stage. In heating stage a bed of preformed product particles is brought to a suitable temperature, so that when it is then transferred to the reaction stage the sensible heat of the hot recirculated bed is sufficient to ensure the conversion of the reactants added to it. The temperature of the bed and the residence time in the reaction stage may be adjusted so that the bed is substantially fully reacted before it is recirculated to the heating stage. A certain fraction of the circulating bed is removed as product.

Therefore a direct-fired process involves the use of two units; a kiln for the heating stage and a reactor. This would also involve a large external recirculation of hot material and a system prone to large heat losses.

We have now found that by using the apparatus which is the subject of this invention, processes which involve the evolution and recovery of a reaction gas can be performed in a single unit operating under conditions of relatively high thermal efficiency.

In an apparatus embodying the present invention, to seal the atmosphere in one vessel from that in the other, the material being transferred from each vessel to the other is made to act as a seal.

The following description relates to the accompanying drawings, which show, by way of example only, two embodiments of the invention.

Figure 1:
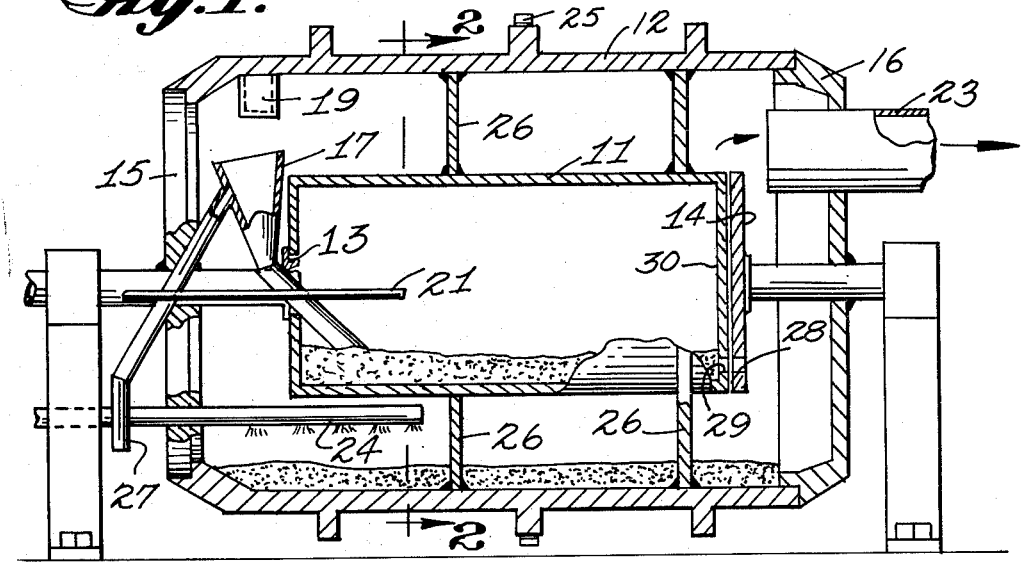
Figure 2:
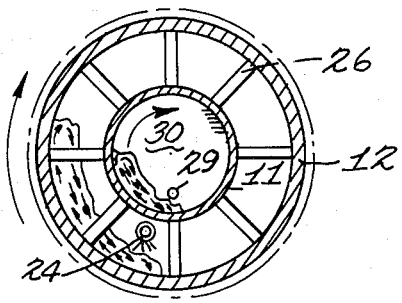
Figure 3:
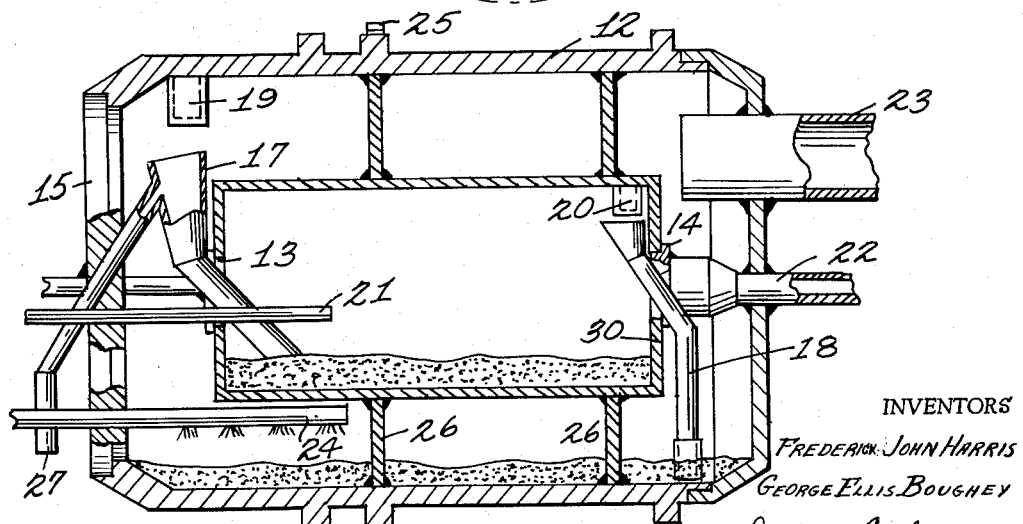

In the drawings:
FIGURE 1 is a diametral sectional elevation through a first embodiment of the invention;
FIGURE 2 is a cross-section on the line 2—2 of FIGURE 1; and
FIGURE 3 is a diametral sectional elevation through a second embodiment of the invention.

In FIGURES 1 and 2 of the drawings, an inner drum 11 is mounted concentrically on supports 26 attached to an outer lagged drum 12. The unit is mounted horizontally. Fixed plates 13 and 14 are caused to bear upon the ends of the inner drum 11 thus sealing it from the outer drum 12. The ends of the outer drum are also closed, but not necessarily sealed, by fixed plates 15 and 16. The plates 13 and 14 are joined to plates 15 and 16 respectively by supports.

The end plate 13 is fitted with a bifurcated chute 17 through which material from the outer drum 12 is transferred to the inner drum 11, or to the product offtake 27. On rotation of the drums, lifting cups 19 carry the material up until it drops into the chute 17 into the inner drum 11. The chute 17 is fitted with an outlet of adjustable height.

The end plate 14 has a hole 28 in its lower segment; there is also a hole 29 in the end wall 30 of drum 11. When these holes become coincident during rotation of the apparatus, material falls from the inner drum 11 into the outer drum 12, whilst the depth of bed in the inner drum 11 provides the gas seal.

As shown in FIGURE 3, the transfer arrangement from the inner drum 11 to the outer drum 12 takes a similar form to that described above for the transfer from the outer drum 12 to the inner drum 11, that is to say, lifting cups 20 are fitted at the end of the inner drum 11 and carry the material up during rotation, to be discharged down a chute 18 leading through the fixed plate 14 into the outer drum 12.

The sealing plate 13 also carries a tube 21 for the introduction of the reactants. A gas offtake 22 and a gas offtake 23 allow for the extraction separately of the gases evolved from the inner drum 11 and the outer drum 12 respectively. If necessary, a gas burner 24 is used to heat the circulating bed to the desired reaction temperature. It is not intended that this invention should be limited by the type of burner used, and any suitable means of introducing heat to the bed of rolling particles may be used.

The depth of the bed of particles in each drum is controlled by adjustment of the outlet on the chute 17 and the size of the hole 28 in the end plate 14, to suit the required reaction conditions. A column of particles is maintained in the chute 17 thereby providing an effective gas seal between each drum. Conveniently, the apparatus is initially charged with particles by any suitable means such as a granule feed chute (not shown) in the stationary plate 16.

In operation, rotation of the reaction kiln, for example by a spur ring 25 and pinion, causes the circulation of the material through the reaction and heating stages.

In a process for which an apparatus in accordance with this invention is ideally suited, the reactants, usually in the form of a slurry or solution, are added to a bed of hot granules through the tube 21. Conditions, such as speed of rotation, bed depths, and bed temperature, are chosen so that substantially all gases evolved in the reaction are given off in the inner drum 11 and are separately extracted through the gas offtake 22. Any pressure differential which might build up between the two drums is compensated for by a suitable controller not shown. The unit, as shown, is mounted horizontally. However, this is not essential to the invention and the apparatus may be mounted at any angle so long as the bed of particles circulates as hereinbefore described, if necessary with the aid of suitably placed lifting flights. The nature of the process described and the rotation of the drums are such as to cause the product to be granular without the necessity of fusing the product or of adding any liquid binders. The reactants may be added film-wise on to the hot granules, thereby reducing diffusional resistance and facilitating the expulsion of any gases or steam produced; hence lower operating temperatures may be used than if the reaction is done in bulk.

Because of the compactness of the apparatus and the absence of any external recirculation system, heat losses are minimised. Moreover, it is convenient to handle with ease extremely high recycle rates at low power consumption with this type of apparatus.

The advantages of using high recirculation loads are that (a) more heat can be introduced into the reaction stage without increasing the temperature of it, thus increasing the amount of reaction, and (b) the granule structure and control of granulation are improved by virtue of the thinness of the skins built up on each granule during each pass.

A rotary reaction kiln as shown in FIGURES 1 and 2 has been used for the manufacture of fertiliser-grade potassium metaphosphate from wet-process phosphoric acid and potassium chloride; this process is the subject of our British Patent Number 832,011.

The apparatus used has been described previously and is illustrated in FIGURES 1 and 2.

The drums 11 and 12 were 4 ft. long x 1¾ ft. diameter and 5 ft. long x 3½ ft. diameter. They were rotated at 32 r.p.m. The reaction slurry of potassium chloride in phosphoric acid was fed in through a tube 21 of ½ inch diameter. Heat was supplied by a gas burner so that the solids entering the inner drum were at about 520° C. The solids circulation rate was between 1,500 and 2,000 lb./hr. The production rate was 55 lb./hr.

A substantial part (90%) of the hydrogen chloride evolved was recovered from the inner drum 11 uncontaminated by combustion gases. Moreover, because of the small percentage of hydrogen chloride in the combustion gases, effluent problems were reduced. The product was granular and fully reacted.

Of course, the invention may take other forms than those of the two embodiments hereinbefore described. In particular, it may be convenient to have the two drums slightly conical in shape tapering outwards towards the output ends, thereby aiding the flow of non-gaseous material through the drums.

In the claims which follow, the mention of the substantial horizontality and substantial coincidence of the axes of rotation of the drums, or of the substantial horizontality of drums arranged one within the other, has reference to the desideratum that the circulation of non-gaseous material within the kiln should be effected with approximately the same degree of ease at all stages. Were the drum axes vertical though coincident, the material would flow easily through one aided by gravity, but flow through the other by mere rotation of the kiln would be impossible. Furthermore, were the axes at very different, although horizontal levels, then the flow from the upper to the lower drum would be aided to some extent by gravity, whilst from the lower drum to the upper it would be impeded.

From the foregoing description of the various embodiments of this invention, it is evident that the objects of this invention, together with many practical advantages are successfully achieved. While preferred embodiments of our invention have been described, numerous further modifications may be made without departing from the scope of this invention.

Therefore, it is to be understood that all matters herein set forth or shown in the accompanying drawings are to be interpreted in an illustrative and not in a limiting sense.

What we claim is:

1. Kiln for reacting a solid material with a reactant to provide an uncontaminated gaseous product or the like, comprising: a first drum rotatably mounted on a substantially horizontal axis; a second drum mounted within said first drum in generally concentric relationship; stationary closure plates associated with both ends of said inner drum and with at least one end of said outer drum; means associated with the stationary plates of said inner drum for providing a transfer of solids between said inner drum and said outer drum during rotation thereof while providing a seal between the atmospheres of said drums in cooperation with the solids being transferred; means for introducing reactant into one of said drums; duct means for exhausting gas from said outer drum; and duct means fixed to adjacent stationary plates of said inner and outer drum for exhausting gas from said inner drum.

2. Kiln defined in claim 1 including means joined to the said stationary outer drum plate for heating the solids in said outer drum.

3. Kiln defined in claim 1 wherein said reactant means is fixed to said stationary outer drum plate and the adjacent stationary inner drum plate whereby reactant is introduced into said inner drum.

4. Kiln defined in claim 1 including a solids offtake duct joined to said transferring means and said stationary outer drum plate for selectively diverting solids from said outer drum out of the kiln.

5. Kiln defined in claim 1 including scoop means carried by the inside of said outer drum for delivering solids to said transferring means during rotation of said drums.

6. Kiln defined in claim 5 wherein said transferring means includes a bifurcated chute joined to one of said stationary inner drum plates in cooperative relationship with said scoop means and extending to the bottom of said inner drum whereby the solids provide a seal therebetween.

7. Kiln defined in claim 6 wherein said inner drum includes a closure end plate joined thereto opposite said chute and said transferring means further includes an aperture in the closure plate radially spaced from the axis of said drum, and the adjacent stationary inner drum plate has a corresponding aperture in the lower segment thereof which is in periodic alignment with said closure plate aperture during rotation, whereby solids are discharged to said outer drum when said apertures are aligned, and the solids in the inner drum form a gas seal.

8. Kiln defined in claim 6 wherein both said inner and outer drum exhaust ducts are joined to said stationary plates.

9. Kiln defined in claim 6 including scoop means carried by said inner drum; a second chute carried by the opposite stationary plate of said inner drum in a position to receive solids from said scoop means during drum rotation, said chute extending to the bottom of said outer drum, whereby the solids form a seal therebetween.

10. Kiln defined in claim 9 wherein stationary plates are associated with both ends of said outer drum.

References Cited in the file of this patent
UNITED STATES PATENTS

| 1,039,812 | Rossiter | Oct. 1, 1912 |
| 2,004,334 | McGregor | June 11, 1935 |